US012667807B2

(12) United States Patent
Yen et al.

(10) Patent No.: US 12,667,807 B2
(45) Date of Patent: Jun. 30, 2026

(54) LOW-TEMPERATURE HYDROGEN OXIDATION SYSTEM

(71) Applicant: TOPLUS ENERGY CORPORATION, Hsinchu County (TW)

(72) Inventors: Ming-Yu Yen, Hsinchu County (TW); Hsu-Lin Chang, Hsinchu County (TW); Fu-Yang Shih, Hsinchu County (TW)

(73) Assignee: TOPLUS ENERGY CORPORATION, Hsinchu County (TW)

( * ) Notice: Subject to any disclaimer, the term of this patent is extended or adjusted under 35 U.S.C. 154(b) by 713 days.

(21) Appl. No.: 17/895,013

(22) Filed: Aug. 24, 2022

(65) Prior Publication Data

US 2023/0364552 A1    Nov. 16, 2023

(30) Foreign Application Priority Data

May 10, 2022    (TW) .................................. 111117528

(51) Int. Cl.
B01D 53/26          (2006.01)
B01D 53/86          (2006.01)

(52) U.S. Cl.
CPC ........... B01D 53/261 (2013.01); B01D 53/86 (2013.01); *B01D 2255/9022* (2013.01); *B01D 2257/108* (2013.01); *B01D 2258/06* (2013.01)

(58) Field of Classification Search
CPC .................. B01D 53/261; B01D 53/86; B01D 2255/9022; B01D 2257/108; B01D 2258/06; B01D 2255/1021; B01D 2255/1023; B01D 2255/1026; B01D 53/52; B01D 53/75; B01D 53/8671;
(Continued)

(56) References Cited

U.S. PATENT DOCUMENTS 11,199,117 B2 * 12/2021 Sung ..................... B01D 53/945
2006/0210454 A1 * 9/2006 Saxena ................ F25J 3/04163
                                                    422/171

(Continued)

FOREIGN PATENT DOCUMENTS

WO    WO-2013150799 A1 * 10/2013    ........ H01M 8/04029

OTHER PUBLICATIONS

Espacenet Machine Translation of WO 2013150799 A1 Obtained on Jan. 16, 2025 (Year: 2025).*

*Primary Examiner* — In Suk C Bullock

(74) *Attorney, Agent, or Firm* — Che-Yang Chen; Law Office of Michael Chen

(57)          ABSTRACT

The invention provides a low-temperature hydrogen oxidation system comprising at least one hydrogen oxidation device, at least one hydrogen reaction module is disposed in the hydrogen oxidation device, at least one hydrogen reaction channel is formed in the hydrogen reaction module and is provided with at least one catalyst, the hydrogen oxidation device is provided with at least one gas inlet channel and at least one gas outlet channel to communicate with the hydrogen reaction channel, at least one cooling channel is further formed in the hydrogen oxidation device; and at least one gas humidifying device disposed at a position of the gas inlet channel.

8 Claims, 12 Drawing Sheets

(58) Field of Classification Search
       CPC ......... H01M 8/04119–04179; H01M 8/04097;
                                      Y02E 60/30; Y02T 90/40
       USPC .......................... 249/505; 423/248; 429/411
       See application file for complete search history.

(56)                      References Cited

U.S. PATENT DOCUMENTS

2007/0166596  A1*    7/2007  Benson ............. H01M 8/04231
                                                            429/513
2010/0047634  A1*    2/2010  Nguyen ............. H01M 8/0612
                                                            429/513
2017/0263962  A1*    9/2017  Koo .................... H01M 8/0662
2022/0077482  A1*    3/2022  Kawabata ............... C01B 32/05

* cited by examiner

LOW-TEMPERATURE HYDROGEN OXIDATION SYSTEM

BACKGROUND OF THE INVENTION

Field of Invention

The invention relates to a low-temperature hydrogen oxidation system, and more particularly to a low-temperature hydrogen oxidation system with small volume, low installation cost, and capable of using cooling liquid to reduce working temperature in order to safely eliminate hydrogen accumulated in the air.

Related Art

At present, hydrogen is used as a carrier gas or raw material gas in various industrial processes. Hydrogen can also be produced in some process reactions, or hydrogen can be discharged in some hydrogen fuel cell applications. However, when the concentration of hydrogen in the air is too high, there is danger of combustion or explosion, so hydrogen usually requires post-processing to avoid accumulation and cause danger. Especially in confined spaces or places with slow air circulation, such as indoor spaces and the outlet of hydrogen discharge pipes, at present, the conventional methods to solve the accumulation of hydrogen usually use combustion or catalytic oxidation for treatment.

However, if it is solved by combustion, because combustion of hydrogen will generate high temperature, high temperature will easily ignite the hydrogen accumulated in the air to cause danger, and the equipment being combusted at high temperature for a long time will easily cause damage to the equipment. In the case of high temperature combustion, NOx gas is easily generated. NOx gas is toxic, so it needs to comply with relevant emission control regulations, and additional processing equipment is required, resulting in additional processing costs, and in the process of combustion, in order to avoid incomplete combustion of hydrogen, it is required to add combustion-supporting gas such as natural gas during combustion, which also increases additional processing costs and carbon emissions.

In addition, there are also catalytic oxidation equipment on the market for hydrogen oxidation, but there is a lack of facilities that can effectively and uniformly dissipate heat. Therefore, it is difficult to stack closely and the volume is large, it is limited by space and high costs for installation. Furthermore, during the oxidation process of catalytic oxidation equipment, due to poor and uneven heat dissipation effect, high temperature is likely to accumulate in local areas, causing hydrogen in the equipment to combust or explode, which causes danger.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above problems, a main object of the invention is to provide a low-temperature hydrogen oxidation system with small volume, low installation cost, and capable of using cooling liquid to reduce working temperature in order to safely eliminate hydrogen accumulated in the air.

Another object of the invention is to provide a low-temperature hydrogen oxidation system that can be handled safely.

Yet another object of the invention is to provide a low-temperature hydrogen oxidation system capable of recovering energy.

In order to achieve the above objects, the invention provides a low-temperature hydrogen oxidation system comprising at least one hydrogen oxidation device, at least one hydrogen reaction module is disposed in the hydrogen oxidation device, at least one hydrogen reaction channel is formed in the hydrogen reaction module, the hydrogen reaction module is provided with at least one catalyst in the hydrogen reaction channel, the hydrogen oxidation device is provided with at least one gas inlet channel and at least one gas outlet channel to communicate with the hydrogen reaction channel, at least one cooling channel is further formed in the hydrogen oxidation device; and at least one gas humidifying device disposed at a position of the gas inlet channel, after passing through the gas humidifying device and the hydrogen reaction channel, hydrogen in the hydrogen-containing air is catalytically oxidized by the catalyst and discharged to reduce a hydrogen concentration.

According to one embodiment of the low-temperature hydrogen oxidation system of the invention, further comprising a gas extraction device, the gas extraction device communicating with the gas inlet channel, the hydrogen reaction channel and the gas outlet channel, the gas extraction device extracting the hydrogen-containing air when being activated, the hydrogen-containing air passing through the gas humidifying device and the hydrogen reaction channel, the gas humidifying device humidifying the hydrogen-containing air, after humidification, the hydrogen-containing air being catalyzed by the catalyst to oxidize hydrogen in the hydrogen-containing air.

According to one embodiment of the low-temperature hydrogen oxidation system of the invention, wherein the catalyst can be any one of platinum catalyst, ruthenium catalyst, and palladium catalyst.

According to one embodiment of the low-temperature hydrogen oxidation system of the invention, wherein the hydrogen reaction module comprises a first isolation layer and a second isolation layer, the hydrogen reaction channel is defined by the first isolation layer and the second isolation layer, and the cooling channel is formed on another sides of the first isolation layer and the second isolation layer opposite to the hydrogen reaction channel.

According to one embodiment of the low-temperature hydrogen oxidation system of the invention, wherein the hydrogen oxidation devices are stacked on one another, a first outer end plate is disposed at a top of the stacked hydrogen oxidation devices, and a second outer end plate is disposed at a bottom of the stacked hydrogen oxidation devices.

According to one embodiment of the low-temperature hydrogen oxidation system of the invention, wherein one or both of the first isolation layer and the second isolation layer can be a heat dissipation material, a heat dissipation plate, a metal plate, or a graphite plate body.

According to one embodiment of the low-temperature hydrogen oxidation system of the invention, wherein the hydrogen reaction module is a tube body, the hydrogen reaction channel is formed in the tube body, and the cooling channel is formed on an outer side of the tube body.

According to one embodiment of the low-temperature hydrogen oxidation system of the invention, wherein the cooling channel is filled with a cooling fluid, and the cooling channel runs through a heat exchange device.

According to one embodiment of the low-temperature hydrogen oxidation system of the invention, wherein the heat exchange device is provided with a hot liquid storage device, the hot liquid storage device has a storage space and a heat exchange pipe, the storage space has an energy storage liquid, and the hot liquid storage device runs through the heat exchange device via the heat exchange pipe.

According to one embodiment of the low-temperature hydrogen oxidation system of the invention, further comprising a hydrogen detection unit, and the hydrogen detection unit being connected to the gas extraction device.

According to one embodiment of the low-temperature hydrogen oxidation system of the invention, further comprising an adsorption device, the adsorption device being communicated with the gas humidifying device, the hydrogen-containing air passing through the adsorption device and the adsorption device adsorbing gases in the hydrogen-containing air poisoning the catalyst, and then sending the hydrogen-containing air to the gas humidifying device.

According to one embodiment of the low-temperature hydrogen oxidation system of the invention, further comprising a treated water collecting device, and the treated water collecting device being communicated with the gas extraction device.

According to one embodiment of the low-temperature hydrogen oxidation system of the invention, wherein a first groove in a serpentine reentrant shape is formed on one side of the first isolation layer, the second isolation layer is disposed on the first groove, the hydrogen reaction channel is defined in the first groove, a second groove in a serpentine reentrant shape is formed on another side of the second isolation layer opposite to the first groove, and the cooling channel is formed in the second groove.

DETAILED DESCRIPTION OF THE INVENTION

The above objects of the invention, as well as its structural and functional features, will be described in accordance with the preferred embodiments of the accompanying drawings.

In the following, for the formation and technical content related to a low-temperature hydrogen oxidation system of the invention, various applicable examples are exemplified and explained in detail with reference to the accompanying drawings;

however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numerals.

Figure 1:
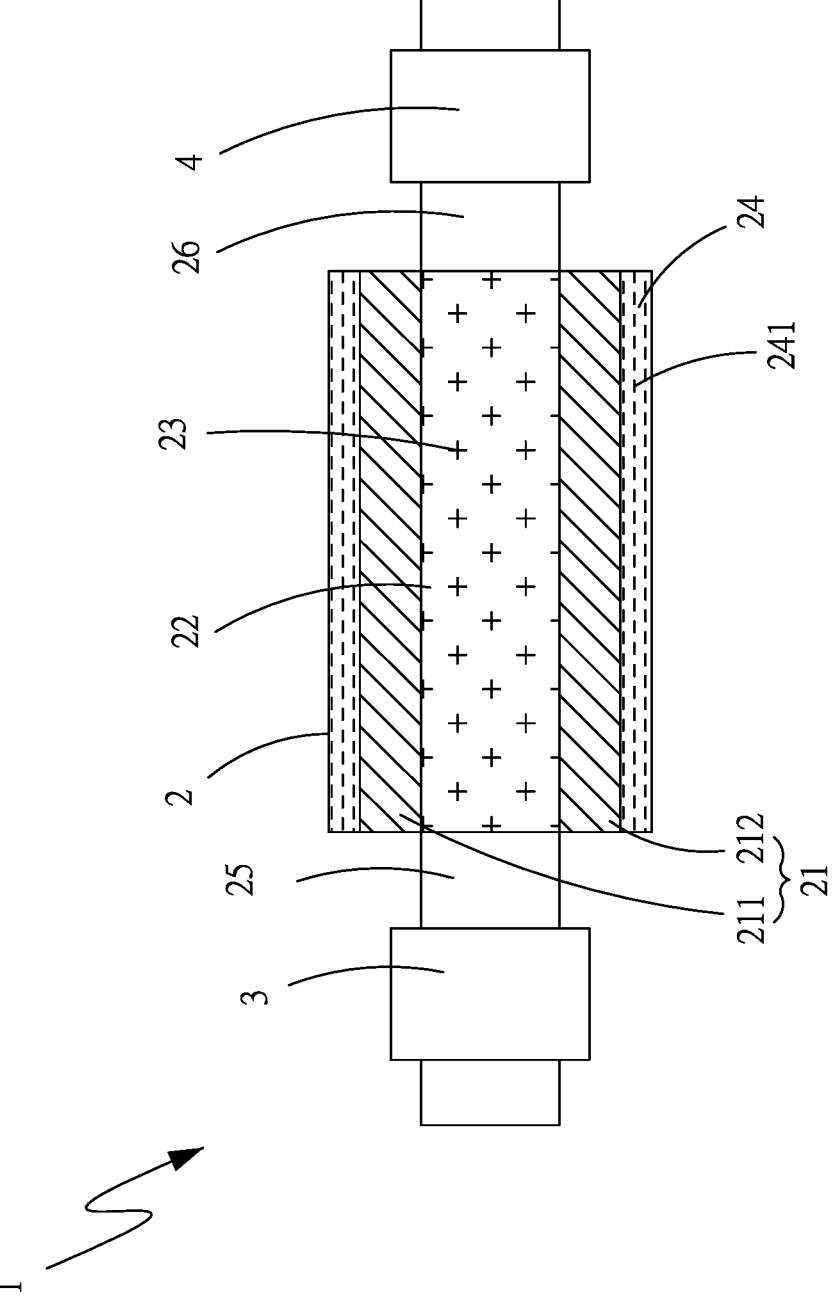
FIG. 1 is a schematic diagram of a low-temperature hydrogen oxidation system of the invention.

First, please refer to FIG. 1 for a schematic diagram of a low-temperature hydrogen oxidation system of the invention. It can be clearly seen from the figure that a low-temperature hydrogen oxidation system 1 comprises at least one hydrogen oxidation device 2, at least one gas humidifying device 3, and at least one gas extraction device 4.

Wherein inside the hydrogen oxidation device 2 is provided with at least one hydrogen reaction module 21, and a hydrogen reaction channel 22 is formed inside the hydrogen reaction module 21. In this embodiment, the hydrogen reaction module 21 is composed of a first isolation layer 211 and a second isolation layer 212, the hydrogen reaction channel 22 is formed between the first isolation layer 211 and the second isolation layer 212, and the hydrogen reaction module 21 is provided with at least one catalyst 23 inside the hydrogen reaction channel 22. The catalyst 23 can be a metal catalyst with catalytic function such as platinum, ruthenium or palladium catalyst, or an alloy catalyst, or a metallic oxide, and a size of the catalyst 23 can be nano-scale particle. In this embodiment, platinum is mainly used as the catalyst 23. In other embodiments, the catalyst 23 can also comprise a catalyst carrier in addition to platinum, and platinum particles are fixed on a surface of the catalyst carrier, wherein the catalyst carrier can be inert materials such as alumina, silicon dioxide and carbon, and the catalyst 23 contains more than 1% by weight of platinum. In addition, at least one cooling channel 24 is formed in the hydrogen oxidation device 2, wherein inside the cooling channel 24 is filled with a cooling fluid 241, and the cooling fluid 241 can be water, air, refrigerant or other refrigerant medium that can take away heat energy, and in this embodiment, two cooling channels 24 are provided, one of the cooling channels 24 is formed on an upper side of the first isolation layer 211, the other cooling channel 24 is formed on a lower side of the second isolation layer 212, and the two cooling channels 24 can be communicated or not communicated with each other, and can be disposed in an open circulation or a closed circulation. In this embodiment, the two cooling channels 24 are not communicated with each other and are implemented in an open circulation. The first isolation layer 211 and the second isolation layer 212 can be plate bodies with airtightness and heat dissipation properties, or plate bodies made of graphite, or metal plates. In addition to forming the hydrogen reaction channel 22, the first isolation layer 211 and the second isolation layer 212 are capable of mainly isolating the hydrogen reaction channel 22 and the cooling channel 24, so that gases in the two channels do not mix with the cooling fluid 241, and high temperature generated during hydrogen reaction can be quickly transferred to the cooling fluid 241. The hydrogen oxidation device 2 is further provided with at least one gas inlet channel 25 and at least one gas outlet channel 26 to communicate with the hydrogen reaction channel 22.

Wherein the gas humidifying device 3 comprises a spray type, a thin film type or a bubble type humidifier, but is not limited to these three humidification methods, as long as the device that can humidify gases is within the scope of protection of the invention, and the gas humidifying device 3 is disposed at a position of the gas inlet channel 25, so that the gas humidifying device 3 is communicated with the gas inlet channel 25.

Wherein a function of the gas extraction device 4 is gas transmission, the gas extraction device 4 can be disposed at a position of the gas outlet channel 26 or the gas inlet channel 25. According to an installation position, the gas extraction device 4 can be a suction pump or a blower, the gas extraction device 4 is communicated with the hydrogen reaction channel 22, the gas inlet channel 25 and the gas outlet channel 26. In this embodiment, the gas extraction device 4 is a suction pump disposed in the gas outlet channel 26, if the gas extraction device 4 is disposed before the gas inlet channel 25, the gas extraction device 4 can be a blower.

Figure 2:
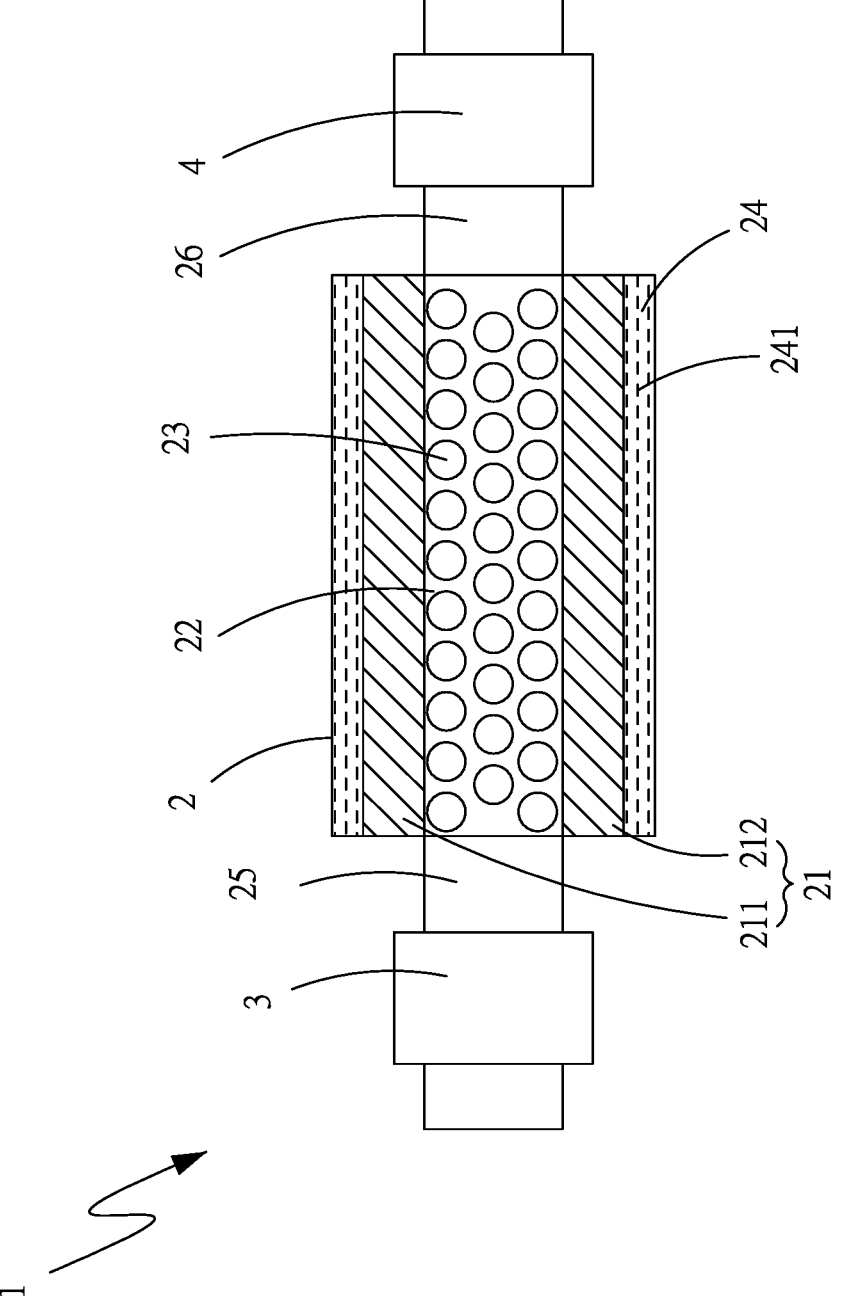
FIG. 2 is a schematic diagram of disposition of a catalyst of the low-temperature hydrogen oxidation system of the invention.

Please refer to FIG. 2 for a schematic diagram of disposition of a catalyst of the low-temperature hydrogen oxidation system of the invention, wherein the catalyst 23 in the hydrogen reaction channel 22 can be disposed in the hydrogen reaction channel 22 by coating, filling or thin film. For example, the catalyst 23 can be coated on inner sides of the first isolation layer 211 and the second isolation layer 212, or filled as particles between the first isolation layer 211 and the second isolation layer 212, or placed between the first isolation layer 211 and the second isolation layer 212 as a catalyst thin film, disposition of the catalyst 23 is not limited thereto, as long as the catalyst 23 is disposed between the first isolation layer 211 and the second isolation layer 212, and a channel can be reserved for hydrogen to pass through, any disposing manner falls within the protection scope of the invention.

The low-temperature hydrogen oxidation system 1 can be installed in a closed space, an indoor space with slow air circulation, a place connected to an outlet of a hydrogen discharge pipe or an outlet of a hydrogen discharge device, where it is easy for hydrogen to accumulate. In this embodiment, the low-temperature hydrogen oxidation system 1 is installed in an indoor space with slow air circulation. When the low-temperature hydrogen oxidation system 1 is in use, the gas extraction device 4 is turned on. When the gas extraction device 4 is turned on, the hydrogen reaction channel 22 and the gas inlet channel 25 are extracted to cause hydrogen-containing air outside the low-temperature hydrogen oxidation system 1 to enter the gas inlet channel 25, the hydrogen-containing air entering the gas inlet channel 25 will first pass through the gas humidifying device 3, and the gas humidifying device 3 humidifies the hydrogen-containing air, so that the hydrogen-containing air contains water vapor to avoid hydrogen ignition, and therefore oxidation is in a safe state. The hydrogen-containing air after humidification enters the hydrogen reaction channel 22 from the gas inlet channel 25, the catalyst 23 in the hydrogen reaction channel 22 performs catalytic oxidation reaction on the hydrogen in the humidified hydrogen-containing air, so that the hydrogen is oxidized into water and a hydrogen concentration in the hydrogen-containing air is reduced. At the same time, high temperature generated by oxidation reaction can be transferred to the cooling fluid 241 in the cooling channel 24 through the first isolation layer 211 or the second isolation layer 212 for cooling, so that the low-temperature hydrogen oxidation system 1 is kept at a safe working temperature to avoid the danger of hydrogen igniting due to high temperature. The gas extraction device 4 continuously extracts gas, and sends the hydrogen-containing air with reduced hydrogen concentration after passing through the catalyst 23 to the gas outlet channel 26 for discharging. Thereby, the low-temperature hydrogen oxidation system 1 is capable of achieving efficacies of small volume and reduced installation cost through close arrangement relationship between the hydrogen reaction channel 22 and the cooling channel 24, and is applicable for various sites. Furthermore, high temperature generated by the hydrogen reaction channel 22 can be instantly cooled through the cooling channel 24 to reduce a working temperature during oxidation reaction, thereby safely reducing hydrogen concentration in the air to avoid danger caused by accumulation of hydrogen.

Figure 3:
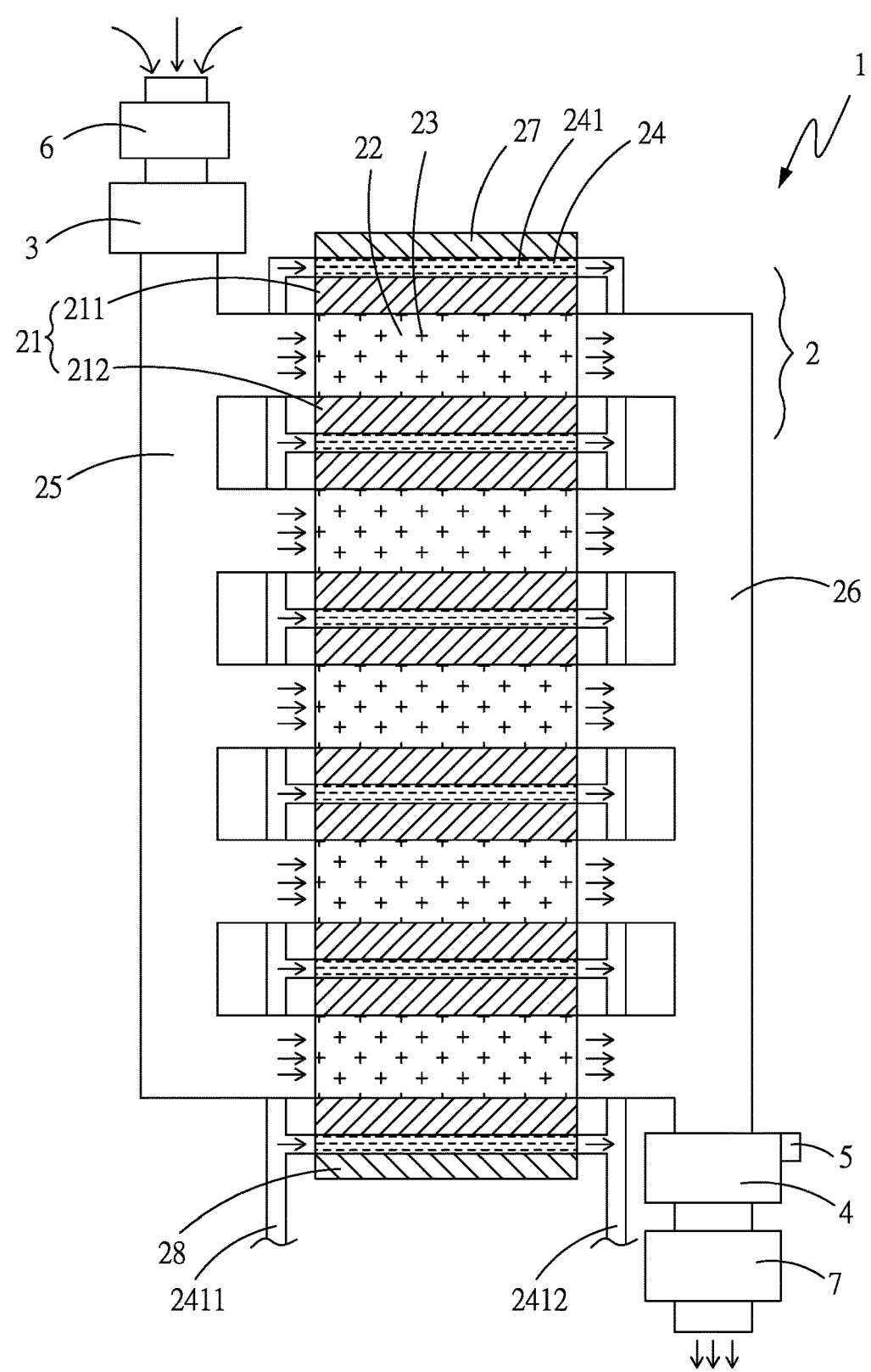
FIG. 3 is a first schematic diagram of implementation of the stacked low-temperature hydrogen oxidation systems of the invention.
Figure 4:
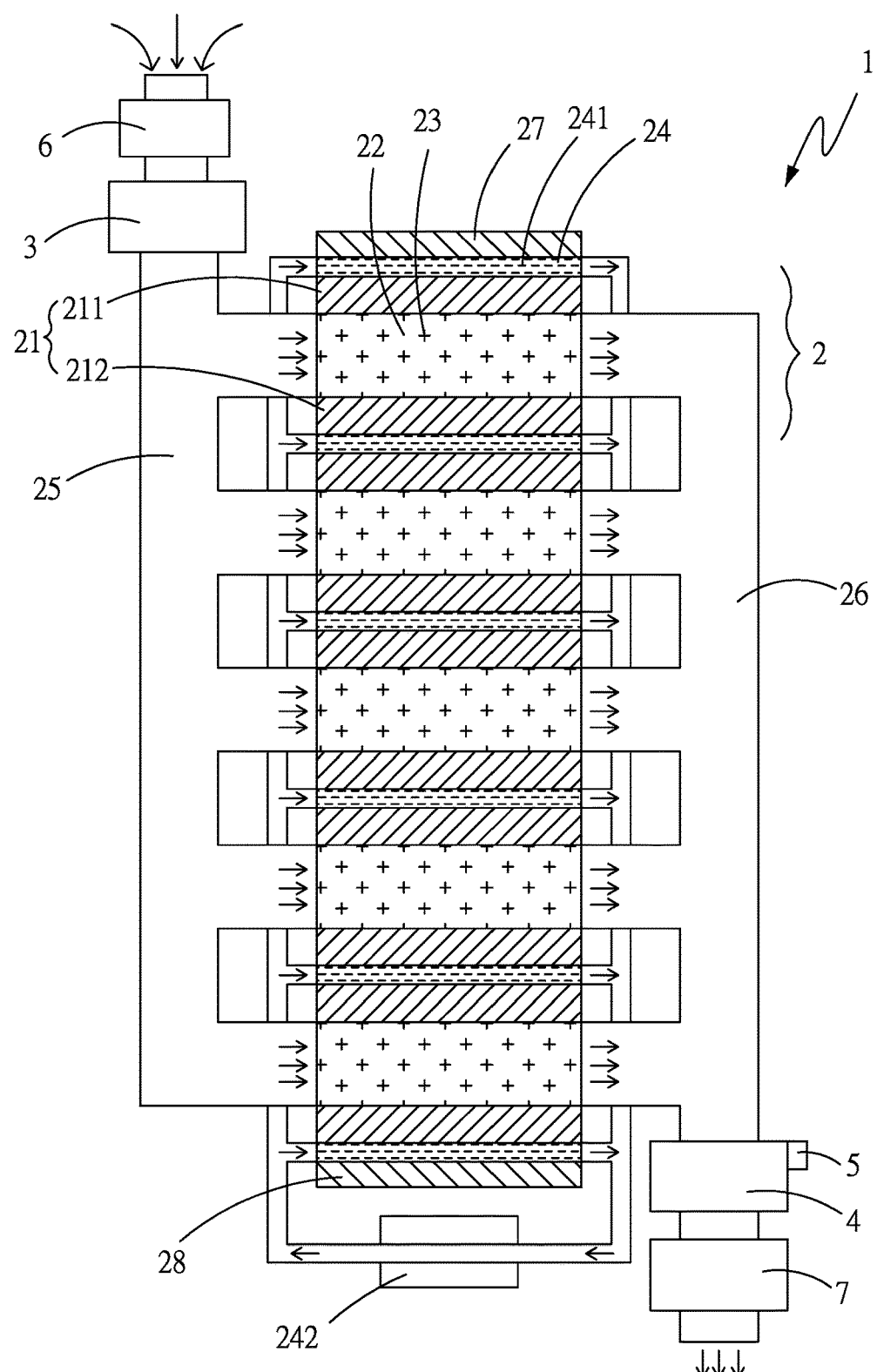
FIG. 4 is a second schematic diagram of implementation of the stacked low-temperature hydrogen oxidation systems of the invention.

Please refer to FIGS. 3 and 4 respectively for a first schematic diagram and a second schematic diagram of implementation of the stacked low-temperature hydrogen oxidation systems of the invention, wherein the low-temperature hydrogen oxidation system 1 further comprises a hydrogen detection unit 5, the hydrogen detection unit 5 is disposed according to requirements, if the low-temperature hydrogen oxidation system 1 is disposed at a hydrogen discharge port, the hydrogen detection unit 5 does not need to be disposed, the hydrogen detection unit 5 is electrically or wirelessly connected to the gas extraction device 4, and the cooling channel 24 can be disposed in a closed circulation or an open circulation. As shown in FIG. 3, the cooling channel 24 is disposed in an open circulation, that is, the cooling channel 24 has an inlet port 2411 and an outlet port 2412, the cooling fluid 241 flows from the inlet port 2411 into the cooling channel 24, and is then discharged from the outlet port 2412, thereby heat generated by oxidation reaction is taken away by the cooling fluid 241. In addition, as shown in FIG. 4, when the cooling channel 24 is disposed in a closed circulation, the cooling channel 24 runs through a heat exchange device 242, the heat exchange device 242 can be a cooling water tower or a cooler. When the cooling fluid 241 in the cooling channel 24 passes through the heat exchange device 242, the heat exchange device 242 absorbs heat energy of the cooling fluid 241. Thereby, heat is continuously dissipated through the cooling fluid 241 and the heat exchange device 242, wherein the low-temperature hydrogen oxidation system 1 comprises the hydrogen oxidation devices 2 stacked on one another, and the cooling channels 24 in stacking mode can be communicated with one another or not communicated with one another. In this embodiment, the cooling channels 24 are communicated with one another and are respectively disposed at a position of the first isolation layer 211 or the second isolation layer 212. In this embodiment, a first outer end plate 27 is disposed at a top of the stacked hydrogen oxidation devices 2, and a second outer end plate 28 is disposed at a bottom of the stacked hydrogen oxidation devices 2. The first outer end plate 27 and the second outer end plate 28 are made of structurally strong and hard materials such as metal plates for fixing the stacked hydrogen oxidation devices 2. In addition, the hydrogen reaction channel 22 of each of the hydrogen oxidation devices 2 is communicated with the gas inlet channel 25 and the gas outlet channel 26 with branches, another end of the gas inlet channel 25 is communicated with the gas humidifying device 3, another end of the gas outlet channel 26 is communicated with the gas extraction device 4, the gas humidifying device 3 is communicated with an adsorption device 6, and the gas extraction device 4 is communicated with a treated water collecting device 7.

When the hydrogen detection unit 5 detects that a hydrogen concentration in an indoor space is higher than a set standard value, the hydrogen detection unit 5 activates the gas extraction device 4. The gas extraction device 4 will extract air from the hydrogen reaction channel 22 and the gas inlet channel 25, so that the hydrogen-containing air outside the low-temperature hydrogen oxidation system 1 passes through the adsorption device 6, the adsorption device 6 adsorbs gases or particles such as dust, hydrogen sulfide in the hydrogen-containing air that will destroy the catalyst 23, the hydrogen-containing air is sent to the gas humidifying device 3 for humidification, and the humidified hydrogen-containing air is sent to the hydrogen oxidation device 2 for safe oxidation reaction. Gases after oxidation reaction are discharged from the gas outlet channel 26, and water produced by oxidation reaction is collected by the treated water collecting device 7. In addition, in the closed circulation system, the cooling fluid 241 in the cooling channel 24 continues to perform cooling through the heat exchange device 242. The heat exchange device 242 can be a cooling water tower or a device for heat dissipation, so that the low-temperature hydrogen oxidation system 1 can be kept at a safe working temperature, thereby the hydrogen detection unit 5 can detect concentration of hydrogen in real time, and hydrogen removal can be performed instantaneously and intelligently. The adsorption device 6 can filter harmful substances for the catalyst 23 first, so that a service life of the catalyst 23 can be prolonged. Through the stacked structure, a larger amount of hydrogen-containing air can be processed, finally, the hydrogen oxidation device 2 can be cooled more quickly by the heat exchange device 242, and then the treated water collecting device 7 can solve the problem of water generated by oxidation reaction, making the overall system more efficient, safer and more convenient in use.

Figure 5:
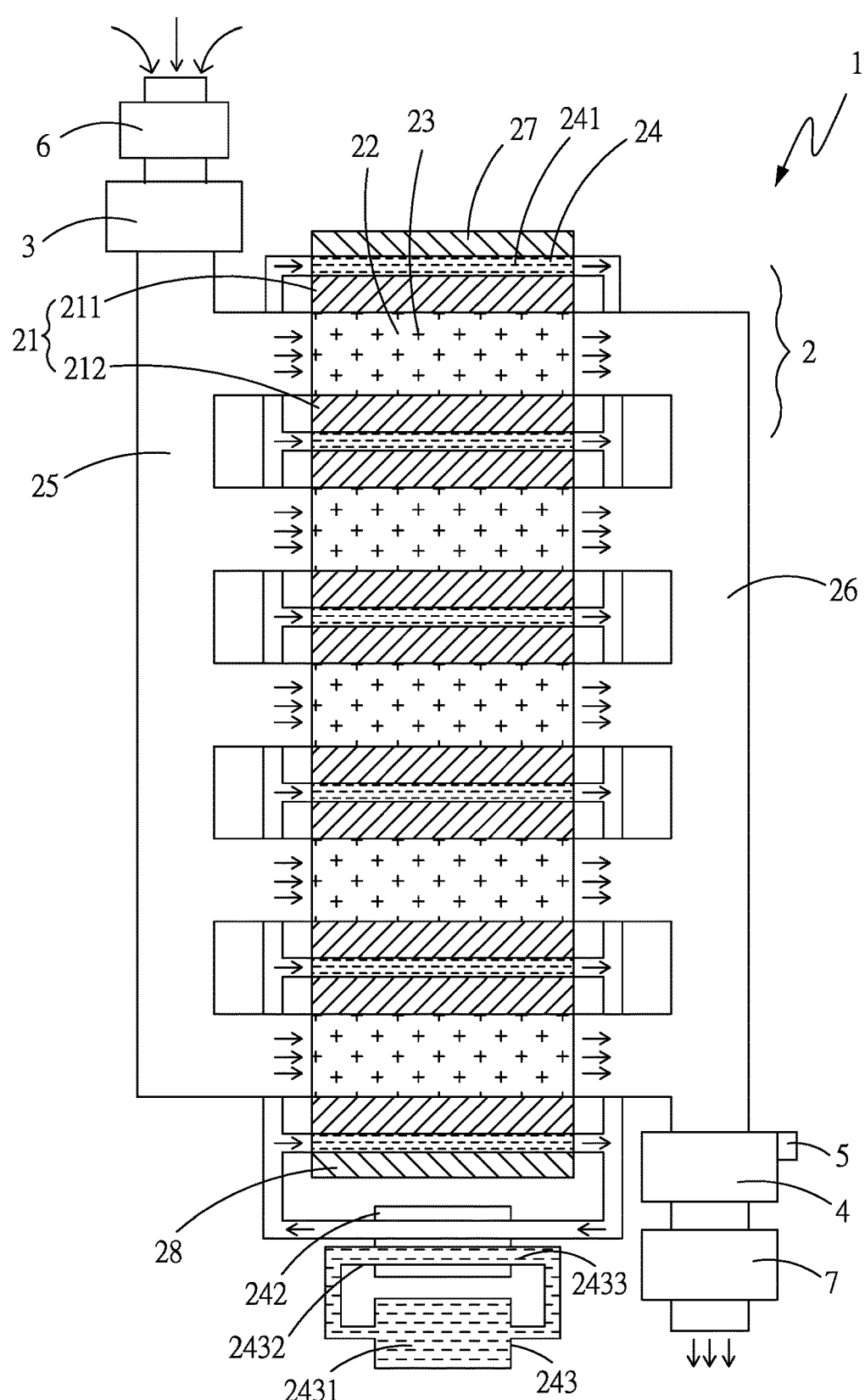
FIG. 5 is a third schematic diagram of implementation of the stacked low-temperature hydrogen oxidation systems of the invention.

Please refer to FIG. 5 for a third schematic diagram of implementation of the stacked low-temperature hydrogen oxidation systems of the invention, wherein the heat exchange device 242 is further connected to a hot liquid storage device 243, the hot liquid storage device 243 can be a steam boiler, a hot water boiler, a water storage equipment, and the hot liquid storage device 243 can be a circulation system, wherein the hot liquid storage device 243 has a storage space 2431 and a heat exchange pipe 2432, the storage space 2431 has an energy storage liquid 2433, and the hot liquid storage device 243 runs through the heat exchange device 242 via the heat exchange pipe 2432. The heat exchange pipe 2432 runs through the heat exchange device 242, so that when the heat exchange device 242 absorbs heat energy of the cooling fluid 241, heat energy of the heat exchange device 242 is absorbed by the energy storage liquid 2433 in the heat exchange pipe 2432. The energy storage liquid 2433 will flow back to the storage space 2431 for storage, thereby the high-temperature energy storage liquid 2433 in the hot liquid storage device 243 can be further reused to achieve efficacies of energy reuse and environmental protection and energy saving. For example, when the energy storage liquid 2433 is water, the cooling fluid 24 after absorbing thermal energy enters the heat exchange device 242 to dissipate heat, the heat exchange device 242 transmits the absorbed heat to the water through the heat exchange pipe 2432, and then the water (hot water) with thermal energy will flow back to the hot liquid storage device 243 for storage. Thereby the hot water is preserved for other purposes, and energy can be reused to achieve efficacies of environmental protection and energy saving.

Figure 6:
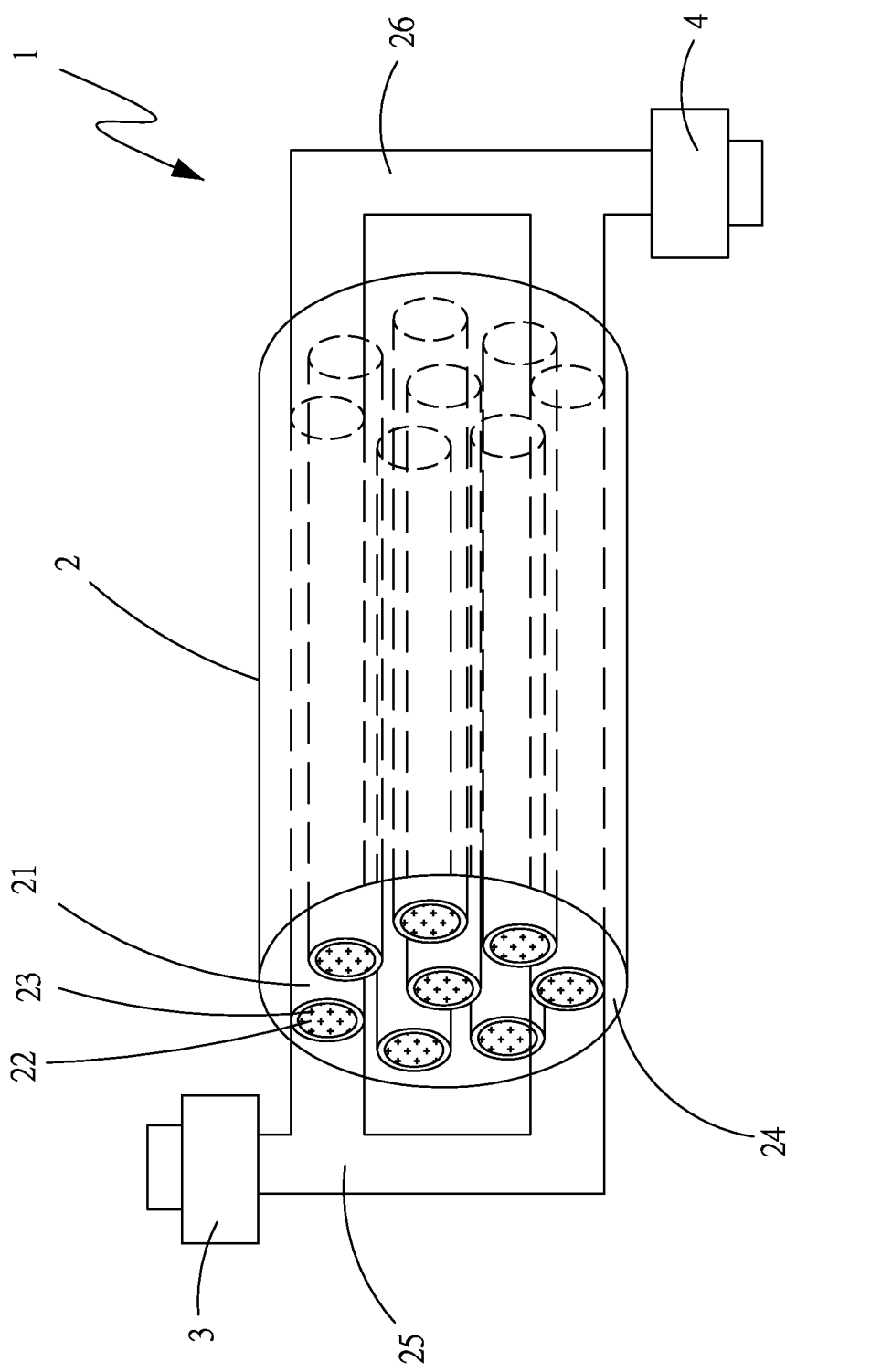
FIG. 6 is a schematic diagram of another low-temperature hydrogen oxidation system of the invention.

Please refer to FIG. 6 for a schematic diagram of another low-temperature hydrogen oxidation system of the invention, wherein inside the hydrogen oxidation device 2 is provided with the hydrogen reaction modules 21, and the hydrogen reaction module 21 is formed with the hydrogen reaction channel 22 therein. In this embodiment, the hydrogen reaction module 21 is a tube body, the hydrogen reaction channel 22 is formed in the tube body, and the catalyst 23 is disposed in the hydrogen reaction channel 22. The cooling channel 24 is formed on an outer side of the tube body, and the cooling channel 24 is filled with the cooling fluid 241 therein. The tube body can be made of a material with airtight and heat dissipation properties, or can be a graphite tube or a metal tube, and capable of isolating the hydrogen reaction channel 22 and the cooling channel 24, and also capable of quickly transferring high temperature generated during hydrogen reaction to the cooling fluid 241. In this embodiment, the cooling channel 24 surrounds an outer side of the hydrogen reaction modules 21, the gas inlet channel 25 and the gas outlet channel 26 communicate with all the hydrogen reaction channels 22. In the figure, two positions are shown as being communicated, the gas humidifying device 3 is disposed at a position of the gas inlet channel 25 and communicated with the hydrogen reaction channel 22, and the gas extraction device 4 is located at a position of the gas outlet channel 26 and communicated with the hydrogen reaction channel 22. Gas flow and oxidation reaction process of this embodiment are consistent with the above-mentioned embodiments in FIGS. 1 to 2. The gas extraction device 4 is used to extract air to make the hydrogen-containing air pass through the gas humidifying device 3 and to reach the hydrogen oxidation device 2. The hydrogen oxidation device 2 safely oxidizes and discharges hydrogen. Therefore, no further description will be given, the difference is that the hydrogen oxidation device 2 in this embodiment is a tubular structure, with the tubular structure, the invention can be applied to various sites, has greater flexibility in use, for example, capable of being applied to sites with circular installation space.

Figure 7:
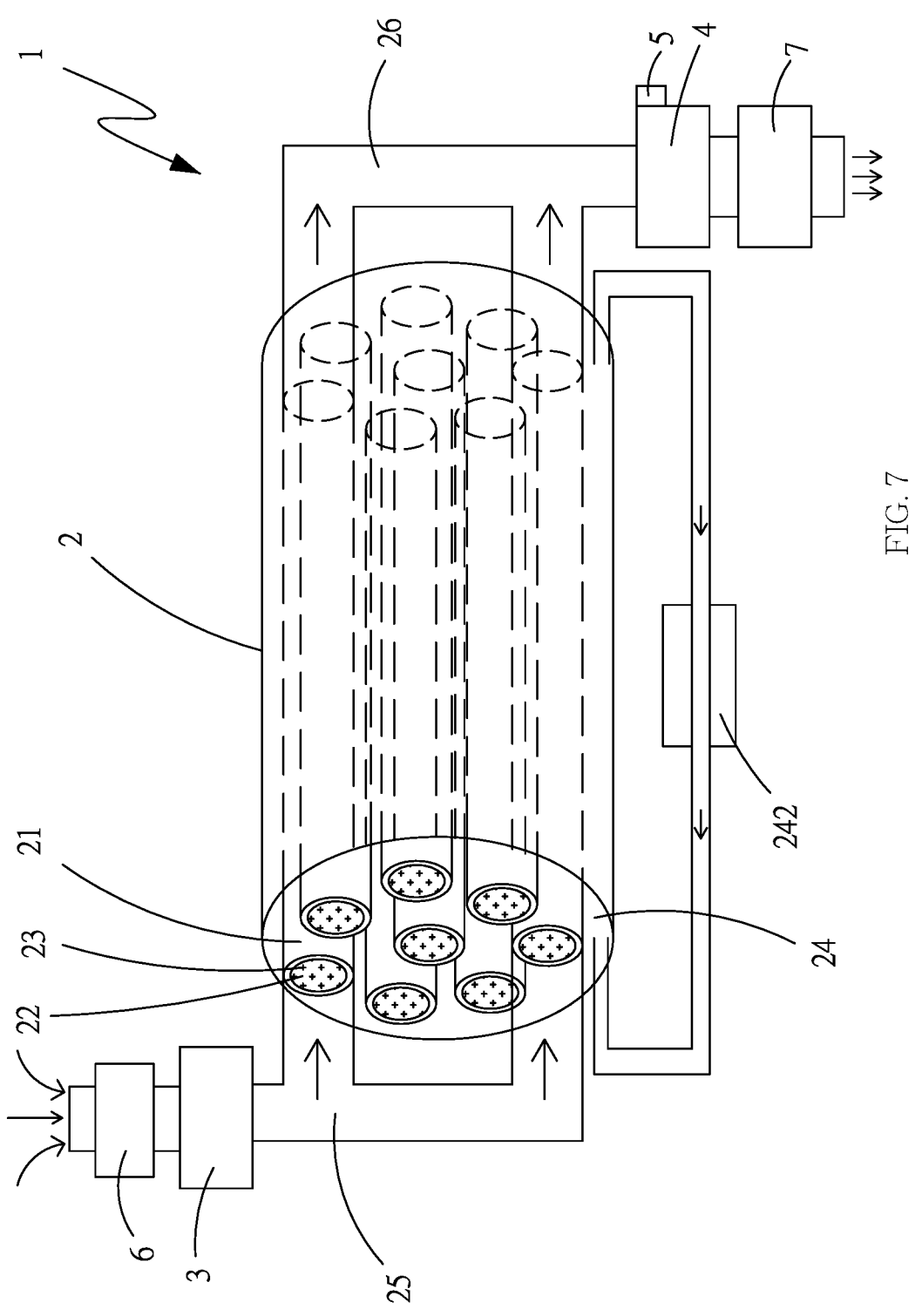
FIG. 7 is a first schematic diagram of implementation of the other low-temperature hydrogen oxidation system of the invention.
Figure 8:
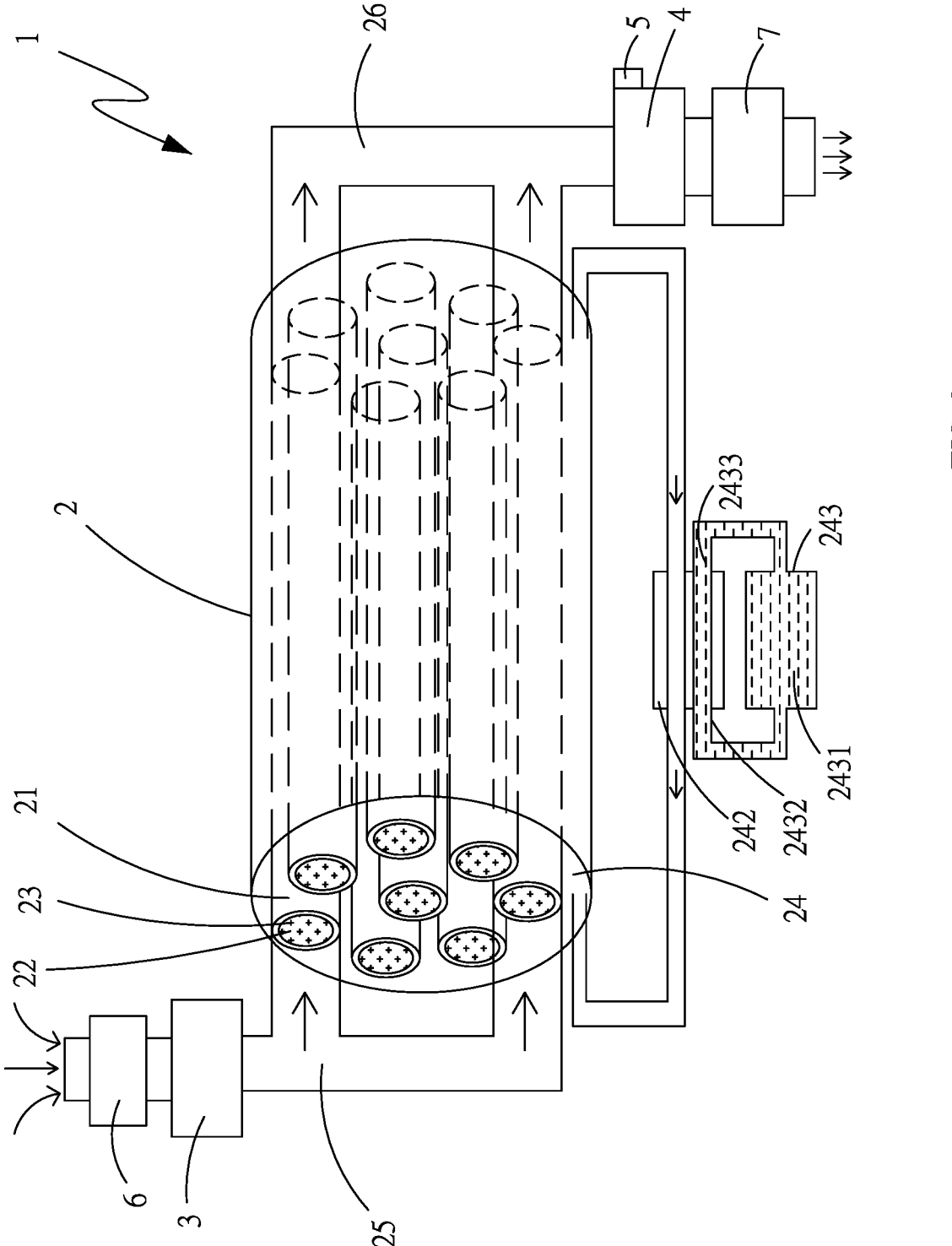
FIG. 8 is a second schematic diagram of implementation of the other low-temperature hydrogen oxidation system of the invention.

Please refer to the above description and FIGS. 7 and 8, wherein functions and actions of the gas detection unit 5, the adsorption device 6, the heat exchange device 242, the hot liquid storage device 243 and the treated water collecting device 7 are the same as the above description, and therefore, no further description will be given, the difference is that the hydrogen oxidation device 2 is a tubular structure, so that the low-temperature hydrogen oxidation system 1 of the invention can be applied to various sites and has greater flexibility in use.

Figure 9:
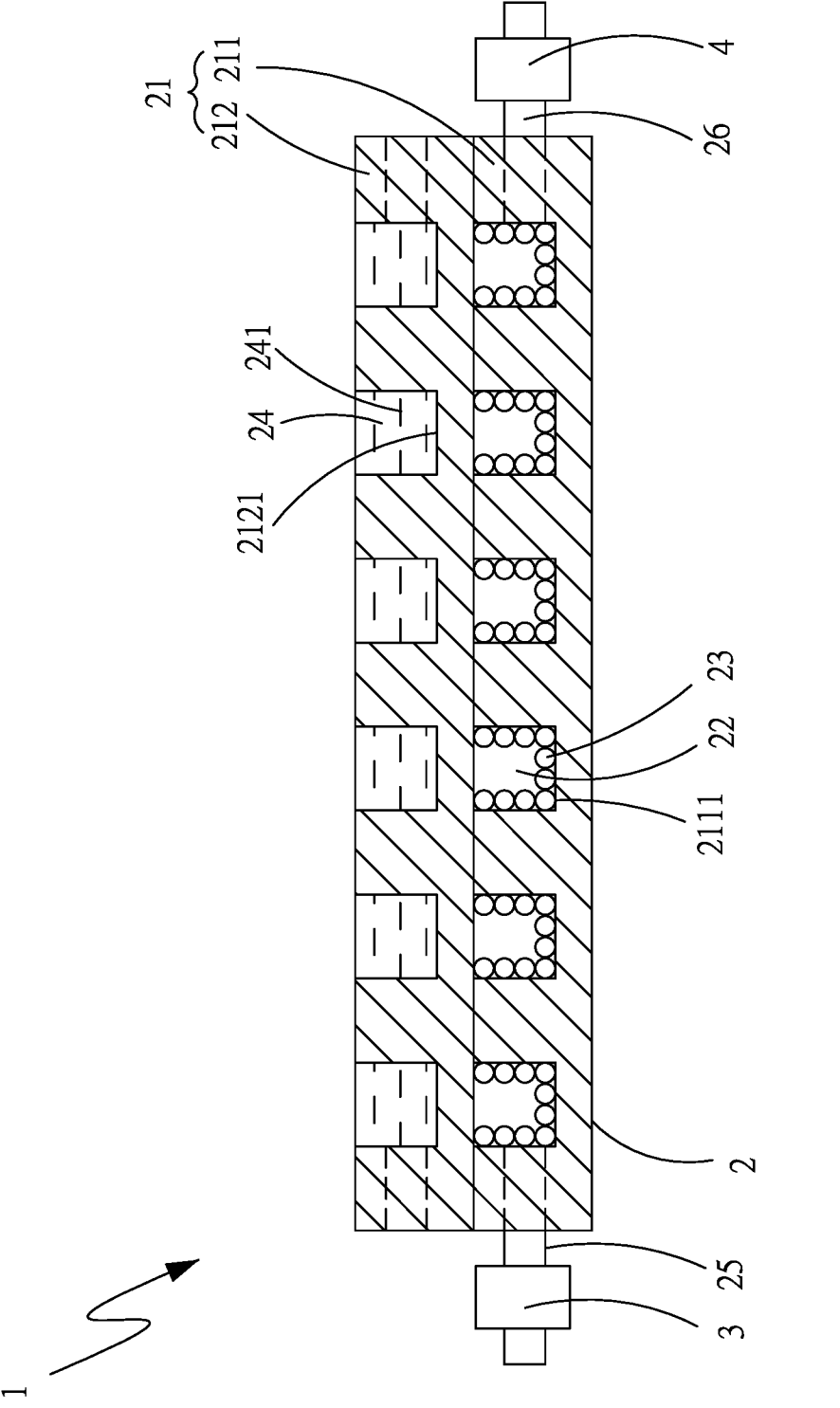
FIG. 9 is a schematic diagram of yet another low-temperature hydrogen oxidation system of the invention.
Figure 10:
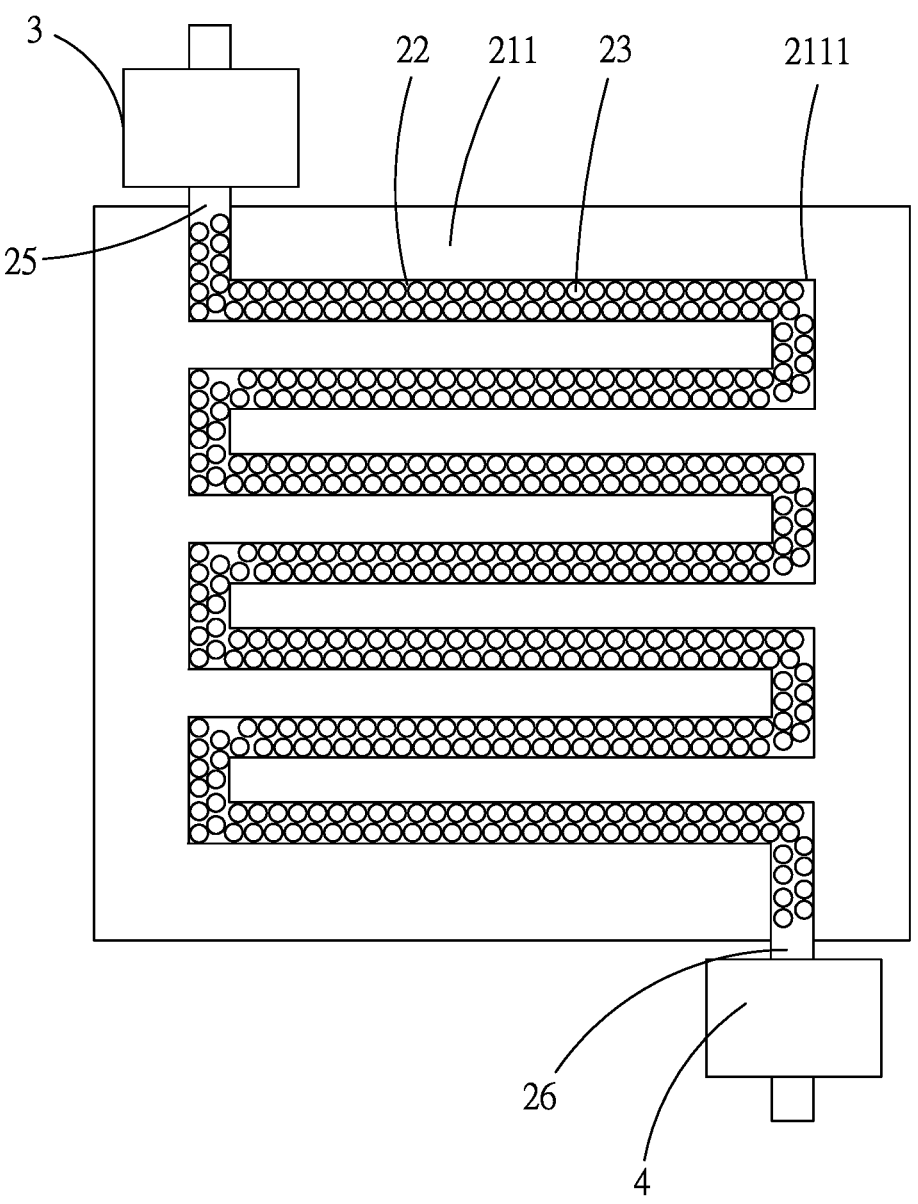
FIG. 10 is a first partial plan view of yet the other low-temperature hydrogen oxidation system of the invention.
Figure 11:
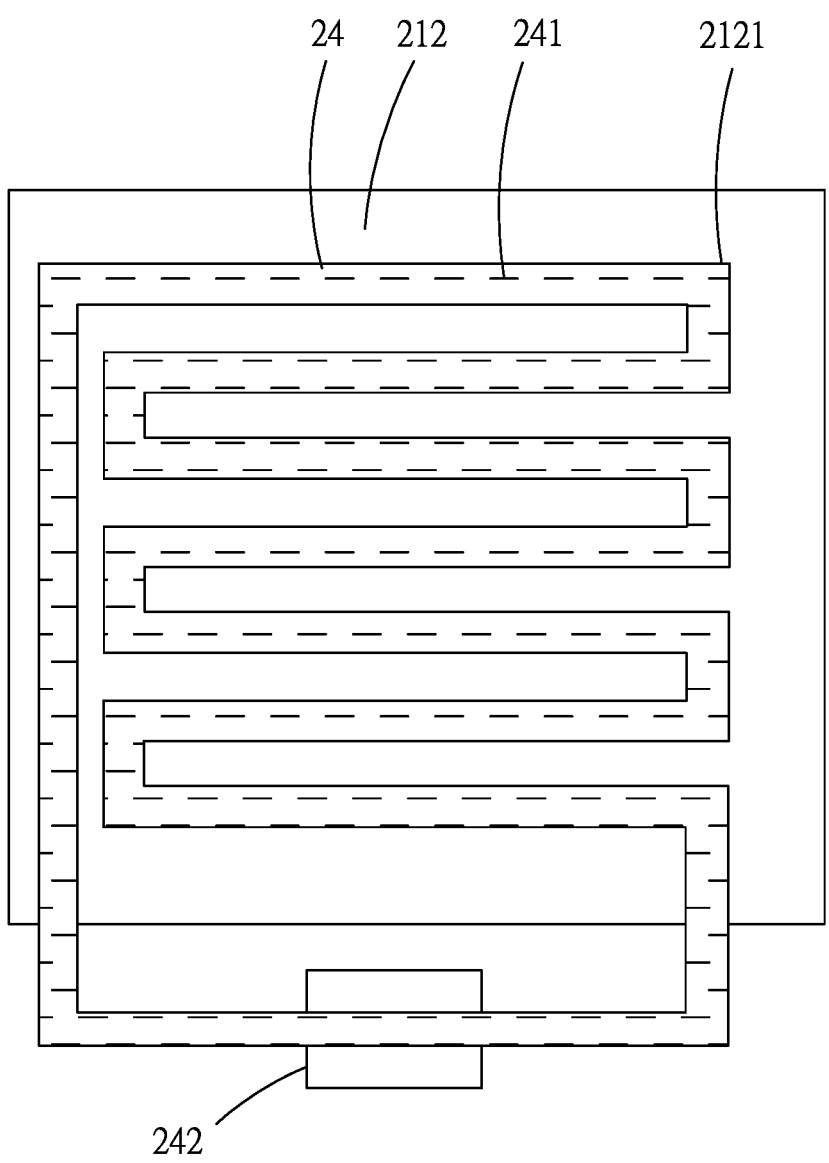
FIG. 11 is a second partial plan view of yet the other low-temperature hydrogen oxidation system of the invention.

Please refer to FIG. 9 to FIG. 11 respectively for a schematic diagram, a first partial plan view, and a second partial plan view of yet another low-temperature hydrogen oxidation system of the invention, wherein the hydrogen reaction module 21 is composed of the first isolation layer 211 and the second isolation layer 212, and the hydrogen reaction channel 22 is formed between the first isolation layer 211 and the second isolation layer 212. In this embodiment, first grooves 2111 in a serpentine reentrant shape are formed on a top side of the first isolation layer 211, the second isolation layer 212 is disposed on an upper side of the first isolation layer 211 and covers the first grooves 2111, and the first isolation layer 211 defines the hydrogen reaction channel 22 through the first grooves 2111 and the second isolation layer 212. The catalyst 23 can be coated, filled or disposed in the form of a thin film in the hydrogen reaction channel 22, the catalyst 23 can be coated on inner sides of the first grooves 2111, or filled between the first grooves 2111 in the form of particles, or placed between the first grooves 2111 in the form of a thin film, and disposing manner of the catalyst 23 is not limited thereto. As long as the catalyst 23 is disposed between the first isolation layer 211 and the second isolation layer 212, and a channel can be reserved for hydrogen to pass through, any disposing manner falls within the protection scope of the invention. Second grooves 2121 in a serpentine reentrant shape are formed on another side of the second isolation layer 212 opposite to the first grooves 2111, and the cooling channel 24 is formed in the second grooves 2121 and penetrates through the heat exchange device 242. The first isolation layer 211 and the second isolation layer 212 must be made of materials with good thermal conductivity and air tightness, capable of isolating the hydrogen reaction channel 22 and the cooling channel 24, so that gas and liquid in the two channels will not be mixed with each other, and also capable of quickly transferring high temperature generated during hydrogen reaction to the cooling fluid 241. When the low-temperature hydrogen oxidation system 1 is in use, the gas extraction device 4 is turned on. When the gas extraction device 4 is turned on, the gas processing channel and the gas inlet channel 25 are extracted. The hydrogen-containing air outside the low-temperature hydrogen oxidation system 1 will enter the gas inlet channel 25, and the hydrogen-containing air entering the gas inlet channel 25 will first pass through the gas humidifying device 3. The hydrogen-containing air is humidified by the gas humidifying device 3, so that the hydrogen-containing air contains water vapor to avoid hydrogen ignition, and oxidation is in a safe state. The hydrogen-containing air after humidification enters the catalyst 23 of the hydrogen reaction channel 22 through the gas inlet channel 25, the catalyst 23 performs oxidation reaction on the hydrogen in the humidified hydrogen-containing air, so that the hydrogen is oxidized into water and hydrogen concentration in the hydrogen-containing air is reduced. The first grooves 2111 in a serpentine reentrant shape are capable of prolonging the time of oxidation reaction between hydrogen and the catalyst 23, so that hydrogen can be reacted more completely, and hydrogen concentration can be reduced more effectively. At the same time, high temperature generated by oxidation reaction can be reduced through the cooling fluid 241 in the cooling channel 24 disposed in a serpentine reentrant shape to keep the low-temperature hydrogen oxidation system 1 at a safe working temperature to avoid the danger of hydrogen igniting due to high temperature, and the gas extraction device 4 continues to extract air, and sends the hydrogen-containing air with reduced hydrogen concentration after passing through the catalyst 23 to the gas outlet channel 26 for discharging. Thereby the low-temperature hydrogen oxidation system 1 can achieve a small volume through the close arrangement relationship between the hydrogen oxidation device 2 and formation of the hydrogen reaction channel 22 and the cooling channel 24 to reduce installation costs. With the hydrogen reaction channel 22 and the cooling channel 24 in a serpentine reentrant shape, hydrogen concentration and working temperature can be reduced more effectively, thereby achieving an efficacy of reducing hydrogen concentration in the air to avoid danger caused by hydrogen.

Figure 12:
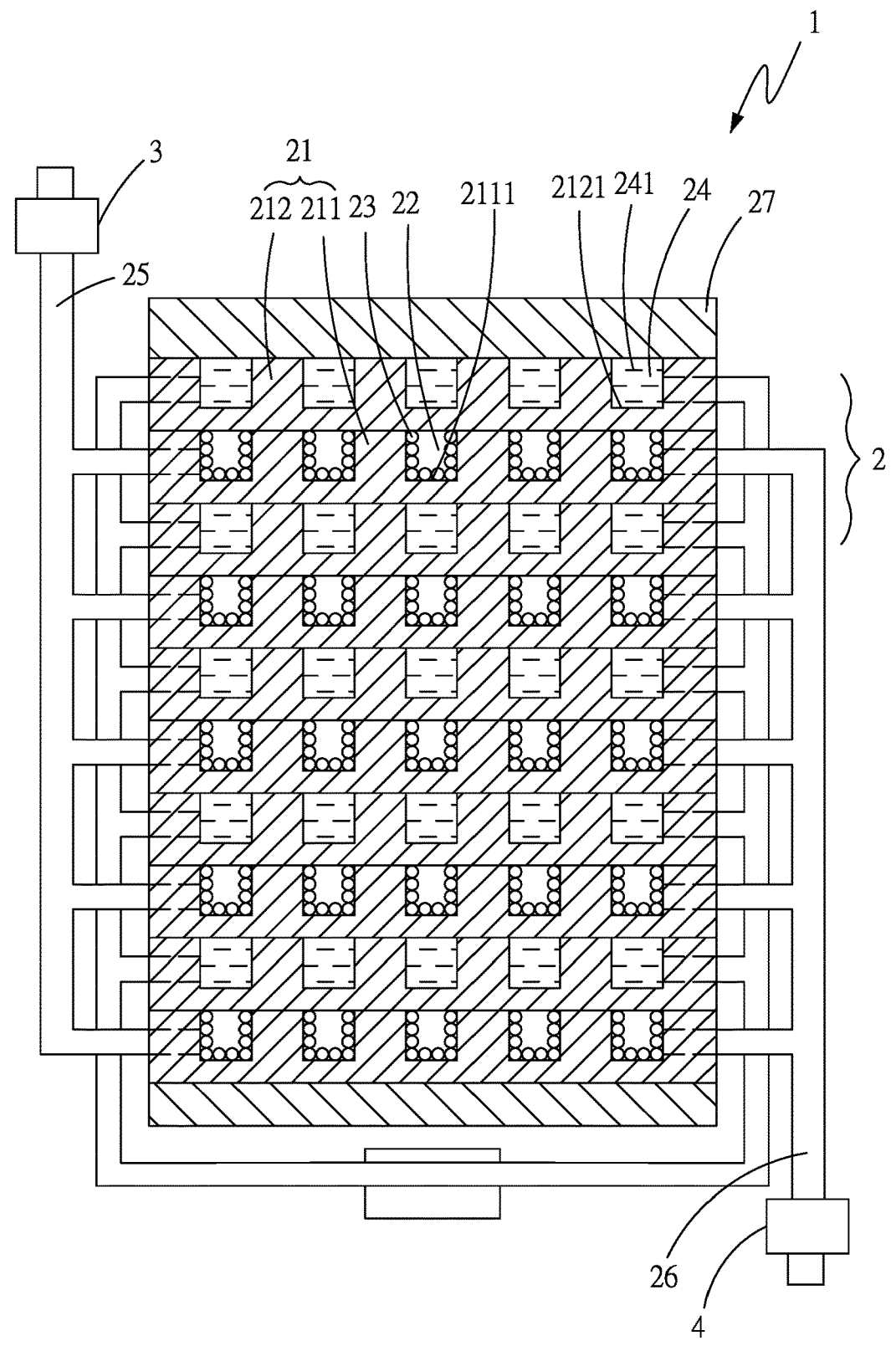
FIG. 12 is a schematic diagram of implementation of yet the other stacked low-temperature hydrogen oxidation systems of the invention.

Please refer to FIG. 12 for a schematic diagram of implementation of yet the other stacked low-temperature hydrogen oxidation systems of the invention, wherein in this embodiment, the low-temperature hydrogen oxidation system 1 comprises the hydrogen oxidation devices 2 stacked on one another, the cooling channels 24 in stacking mode can be communicated with one another or not communicated with one another. In this embodiment, the cooling channels 24 are communicated with one another. In the mode where the hydrogen oxidation devices 2 are stacked on one another, a top of the stacked hydrogen oxidation devices 2 is disposed with the first outer end plate 27, and the second outer end plate 28 is disposed at a bottom of the stacked hydrogen oxidation devices 2 for fixing the stacked hydrogen oxidation devices 2. The cooling channel 24 of the uppermost hydrogen oxidation device 2 is covered by the first outer end plate 27, and the other cooling channels 24 are covered by the first isolation layers 211 of the hydrogen oxidation devices 2. In addition, each of the hydrogen reaction channels 22 is communicated with the gas inlet channel 25 and the gas outlet channel 26 with branches, another end of the gas inlet channel 25 is communicated with the gas humidifying device 3, another end of the gas outlet channel 26 is communicated with the gas extraction device 4. When the low-temperature hydrogen oxidation system 1 is in use, the hydrogen-containing air passes through the gas humidifying device 3 to reach the hydrogen reaction channels 22 for oxidation reaction, and then the reacted gas is sent to the gas outlet channel 26 for discharge. Gas flow and oxidation reaction process are the same as the above-mentioned embodiment in FIG. 9, so it will not be repeated. The difference from the above-mentioned embodiment in FIG. 9 is that this embodiment is a stack structure capable of processing more hydrogen at the same time and improving an efficiency of hydrogen processing. Thereby the low-temperature hydrogen oxidation system 1 can achieve a small volume through the close arrangement relationship between the hydrogen oxidation device 2 and formation of the hydrogen reaction channel 22 and the cooling channel 24 to reduce installation costs, and is applicable for various sites. Furthermore, the hydrogen reaction channel 22 can be instantly cooled through the cooling channel 24 to reduce a working temperature, thereby achieving an efficacy of reducing hydrogen concentration in the air to avoid danger caused by accumulation of hydrogen.

Although not shown in the figures, the gas detection unit 5, the adsorption device 6, the heat exchange device 242, the hot liquid storage device 243 and the treated water collecting device 7 can also be installed in the embodiments of FIGS. 9 and 12 as appropriate, so that the overall system is more efficient, has long service life, is safe and more convenient to use.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. A hydrogen oxidation system comprising:

at least one hydrogen oxidation device, at least one hydrogen reaction module being disposed in the at least one hydrogen oxidation device, at least one hydrogen reaction channel being formed in the at least one hydrogen reaction module, the at least one hydrogen reaction module being provided with at least one catalyst in the at least one hydrogen reaction channel, the at least one hydrogen oxidation device being provided with at least one gas inlet channel and at least one gas outlet channel to communicate with the at least one hydrogen reaction channel, at least one cooling channel being further formed in the at least one hydrogen oxidation device; and at least one gas humidifying device comprising a spray, thin film, or bubble humidifier, disposed at a position of the at least one gas inlet channel, wherein after passing through the at least one gas humidifying device and the at least one hydrogen reaction channel, hydrogen in the hydrogen-containing air being catalytically oxidized by the at least one catalyst and discharged to reduce a hydrogen concentration;

wherein the at least one hydrogen reaction module comprises a first isolation layer and a second isolation layer, and the at least one hydrogen reaction channel is defined by the first isolation layer and the second isolation layer;

wherein the hydrogen oxidation devices are stacked on one another, a first outer end plate is disposed at a top of the stacked hydrogen oxidation devices, and a second outer end plate is disposed at a bottom of the stacked hydrogen oxidation devices;

wherein one or both of the first isolation layer and the second isolation layer is a heat dissipation material, a heat dissipation plate, a metal plate, or a graphite plate body;

wherein a first groove in a serpentine reentrant shape is formed on one side of the first isolation layer, the second isolation layer is disposed on the first groove, the at least one hydrogen reaction channel is defined in the first groove, a second groove in a serpentine reentrant shape is formed on another side of the second isolation layer opposite to the first groove, and the at least one cooling channel is formed in the second groove; and wherein the at least one catalyst is coated on inner sides of first grooves.

2. The hydrogen oxidation system as claimed in claim 1, further comprising a gas extraction device, the gas extraction device communicating with the at least one gas inlet channel, the at least one hydrogen reaction channel and the at least one gas outlet channel, the gas extraction device extracting the hydrogen-containing air when being activated, the hydrogen-containing air passing through the at least one gas humidifying device and the at least one hydrogen reaction channel, the at least one gas humidifying device humidifying the hydrogen-containing air, after humidification, the hydrogen-containing air being catalyzed by the at least one catalyst to oxidize hydrogen in the hydrogen-containing air and discharged.

3. The hydrogen oxidation system as claimed in claim 1, wherein the at least one catalyst can be any one of platinum catalyst, ruthenium catalyst, and palladium catalyst.

4. The low temperature hydrogen oxidation system as claimed in claim 1, wherein the at least one cooling channel is filled with a cooling fluid, and the at least one cooling channel runs through a heat exchange device.

5. The hydrogen oxidation system as claimed in claim 4, wherein the heat exchange device is provided with a hot liquid storage device, the hot liquid storage device has a storage space and a heat exchange pipe, the storage space has an energy storage liquid, and the hot liquid storage device runs through the heat exchange device via the heat exchange pipe.

6. The low temperature hydrogen oxidation system as claimed in claim 2, further comprising a hydrogen detection unit, and the hydrogen detection unit being connected to the gas extraction device.

7. The low temperature hydrogen oxidation system as claimed in claim 2, further comprising an adsorption device, the adsorption device being communicated with the at least one gas humidifying device, the hydrogen-containing air passing through the adsorption device and the adsorption device adsorbing gases in the hydrogen-containing air poisoning the at least one catalyst, and then sending the hydrogen-containing air to the at least one gas humidifying device.

8. The hydrogen oxidation system as claimed in claim 2, further comprising a treated water collecting device, and the treated water collecting device being communicated with the gas extraction device.

* * * * *